US012162237B2

(12) United States Patent
Verweij

(10) Patent No.: US 12,162,237 B2
(45) Date of Patent: Dec. 10, 2024

(54) BOX-FORMING APPARATUS

(71) Applicant: BluePrint Holding B.V., Woerden (NL)

(72) Inventor: Theo Verweij, Noordwijk (NL)

(73) Assignee: BluePrint Holding B.V., Woerden (NL)

( * ) Notice: Subject to any disclaimer, the term of this patent is extended or adjusted under 35 U.S.C. 154(b) by 35 days.

(21) Appl. No.: 18/251,543

(22) PCT Filed: Nov. 5, 2021

(86) PCT No.: PCT/NL2021/050680
§ 371 (c)(1),
(2) Date: May 3, 2023

(87) PCT Pub. No.: WO2022/098238
PCT Pub. Date: May 12, 2022

(65) Prior Publication Data

US 2024/0042721 A1 Feb. 8, 2024

(30) Foreign Application Priority Data

Nov. 6, 2020 (NL) ..................................... 2026844

(51) Int. Cl.
*B31B 50/44* (2017.01)
*B31B 50/06* (2017.01)

(52) U.S. Cl.
CPC ............ *B31B 50/44* (2017.08); *B31B 50/062* (2017.08)

(58) Field of Classification Search
CPC ..... B31B 50/00; B31B 50/003; B31B 50/444; B31B 50/52; B31B 50/46; B31B 50/062;
(Continued)

(56) References Cited

U.S. PATENT DOCUMENTS 4,500,306 A * 2/1985 Nowacki ................. B31B 50/44
493/143
2007/0037682 A1* 2/2007 Scholtes ................. B31B 50/44
493/175
(Continued)

FOREIGN PATENT DOCUMENTS

| | | | |
|---|---|---|---|
| EP | 3 246 152 | A1 | 11/2017 |
| IT | BO20 060329 | A1 | 8/2006 |
| WO | 2018 088622 | A1 | 5/2018 |

*Primary Examiner* — Stephen F. Gerrity
*Assistant Examiner* — Linda J Hodge
(74) *Attorney, Agent, or Firm* — N.V. Nederlandsch Octrooibureau

(57) ABSTRACT

A box forming apparatus comprising a machine frame, and an outer mould and an inner mould arranged on the machine frame for forming a blank into a box. The outer mould and the inner mould are configured to be movable relative to one another along a pressing direction between an open configuration and a pressing configuration, for receiving the blank between the outer and inner moulds in the open configuration, for subsequently pressing the blank in the pressing configuration to form the box, and for discharging the box in the open configuration after pressing and forming the box. The outer and inner moulds comprise mould element sets of an outer mould element and an associated inner mould element, wherein the outer mould elements define the outer mould and the inner mould elements define the inner mould, and the outer mould element and the inner mould element of each mould element set are movable relative to one another along the pressing direction between positions associated with the open configuration and the pressing configuration, and wherein the mould element sets are movable relative to another along a plane transverse to the pressing direction to allow adjusting to dimensions of the box to be formed.

12 Claims, 5 Drawing Sheets

(58) Field of Classification Search
CPC ... B31B 50/30; B31B 50/28; B31B 50/44–50; B31B 50/784; B31B 50/624; B65B 2220/02; B65B 43/08
USPC .......................................... 493/167, 169, 175
See application file for complete search history.

(56) References Cited

U.S. PATENT DOCUMENTS

2011/0256997 A1* 10/2011 Michels ............... B65H 3/0816 493/124
2011/0294638 A1* 12/2011 Tosevski .................. B65D 5/22 493/137
2012/0115698 A1* 5/2012 Vizanova Alzamora .................... B31B 50/26 493/126
2022/0410522 A1* 12/2022 Rodot ..................... B31B 50/44

* cited by examiner

BOX-FORMING APPARATUS

FIELD OF THE INVENTION

The invention relates to a box-forming apparatus comprising a machine frame and an outer mould and an inner mould arranged on the machine frame for forming a blank into a box, wherein the outer mould is associated with an outside of the box and the inner mould is associated with an inside of the box, and wherein the outer mould and the inner mould are configured to be movable relative to one another along a pressing direction between an open configuration and a pressing configuration, for receiving the blank between the outer mould and the inner mould in the open configuration, for subsequently pressing the blank between the outer mould and the inner mould in the pressing configuration, and for discharging the box from in between the outer mould and the inner mould in the open configuration after pressing.

BACKGROUND OF THE INVENTION

Packing boxes for packing of articles come in a large number of dimensions and forms, and allow for storage and transport. Articles are packed into the packing boxes in packing lines for which one likes to have flexibility in the selection of articles to be packed and packing boxes into which the articles are packed. The size and shape of the required packing box will differ on the type, the configuration and the number of articles to be packed. Preferably, a packing box having a different size and/or shape is readily at hand to be able to change over to packing articles into such other type of packing box.

Packing boxes are generally formed from blanks, which are mostly made from corrugated cardboard. A blank is specific to a size and a shape of the corresponding packing box. The blank has precut panels, which will become panels of the packing box once the packing box has been shaped from the blank. The packing boxes are generally formed from the blanks at the location where the articles are packed into the packing boxes, since a pile of blanks takes a minimum of space as compared to a stock of empty packing boxes. The blanks are fed one by one into a box-forming machine to form the respective packing boxes, which are subsequently provided to a packing line for packing articles into the packing boxes.

Preferably, a box-forming apparatus is suited to efficiently form packing boxes of various sizes and shapes, and efficiently handle and switch between the corresponding blanks. A fast, accurate and stable adaption of the box-forming apparatus is therefore required to provide high throughputs of boxes formed and of boxes having the intended dimensions. Presently known box-forming apparatus tend to have play in both setting the dimensions of the box to be formed and in the box-forming itself. This at least limits accuracy, throughput and switch-over time, which is even further limited by a relatively high mass and mechanical friction of the known constructions.

SUMMARY OF THE INVENTION

It is an objective of the invention to provide a box-forming apparatus that efficiently processes blanks into packing boxes.

It is another or alternative objective of the invention to provide a box-forming apparatus that can easily be adapted to forming of another type of packing box.

It is yet another or alternative objective of the invention to provide a box-forming apparatus that can efficiently process various types of blanks into packing boxes.

It is yet another or alternative objective of the invention to provide a box-forming apparatus that allows for a high throughput of blanks into packing boxes.

It is yet another or alternative objective of the invention to provide an adjustable box-forming apparatus that is very stable.

It is yet another or alternative objective of the invention to provide a box-forming apparatus that forms boxes of accurate dimensions.

It is yet another or alternative objective of the invention to provide a box-forming apparatus that provides a reduced play in setting dimensions of a box to be formed, and/or in the box-forming itself.

It is yet another or alternative objective of the invention to provide a box-forming apparatus that provides for a reduced weight and/or mechanical friction of the moving parts for box dimension setting and actual box forming, for instance, to increase throughput.

It is yet another or alternative objective of the invention to provide a box-forming apparatus that allows for a flexible adjustment setting of box-forming parts to allow to correct for, for instance, possible deviations caused by the box forming process itself, such as caused by friction by the blanks used to form the boxes.

In an aspect the invention provides a box-forming apparatus comprising a machine frame and an outer mould and an inner mould arranged on the machine frame for forming a blank into a box,

- wherein the outer mould is associated with an outside of the box and the inner mould is associated with an inside of the box, and wherein the outer mould and the inner mould are configured to be movable relative to one another along a pressing direction between an open configuration and a pressing configuration, for receiving the blank between the outer mould and the inner mould in the open configuration, for subsequently pressing the blank between the outer mould and the inner mould in the pressing configuration to form the box, and for discharging the box from in between the outer mould and the inner mould in the open configuration after pressing and forming the box,
- wherein the outer mould and the inner mould comprise mould element sets of an outer mould element of the outer mould and an associated inner mould element of the inner mould, the outer mould elements of the mould element sets define the outer mould and the inner mould elements of the mould element sets define the inner mould, and the outer mould element and the inner mould element of each mould element set are movable relative to one another along the pressing direction between positions associated with the open configuration and the pressing configuration,
- wherein the mould element sets are movable relative to one another along a plane transverse to the pressing direction to allow adjusting to dimensions of the box, and
- wherein each mould element set comprises an actuator for actuating relative movement with respect to one another of the outer mould element and the inner mould element of the respective mould element set along the pressing direction for relative movement with respect to one another of the outer mould element and the inner mould element of each mould element set along the pressing direction to be mechanically independent from relative movement with respect to one another of the outer mould element and the inner mould element of each other mould element set along the pressing direction, and to be mechanically independent from movement of the mould element sets relative to another along a plane transverse to the pressing direction. Mechanically independent is intended to mean mechanically decoupled.

In an embodiment, the actuator of each mould element set actuates movement of one of the outer mould element and the inner mould element of the respective mould element set with respect to the machine frame along the pressing direction, while the other one of the outer mould element and the inner mould element of the respective mould element set is fixedly mounted on the machine frame with respect to the pressing direction.

In an embodiment, the actuator of each mould element set comprises an electric motor.

In an embodiment, the actuators of the mould element sets are electronically coupled for a joint relative movement of the outer mould element and the inner mould element of the respective mould element sets along the pressing direction.

In an embodiment, the machine frame comprises a forming frame having forming frame holding parts that are movable relative to another along the plane transverse to the pressing direction, and each mould element set is attached to a respective forming frame holding part, and wherein the forming frame holding parts are drivingly coupled for relative movement with respect to one another along the plane transverse to the pressing direction at two coupling locations on each forming frame holding part, which coupling locations are separated by a distance along the pressing direction.

In an aspect the invention provides a box forming apparatus comprising a machine frame and an outer mould and an inner mould arranged on the machine frame for forming a blank into a box, wherein the outer mould is associated with an outside of the box and the inner mould is associated with an inside of the box, and wherein the outer mould and the inner mould are configured to be movable relative to one another along a pressing direction between an open configuration and a pressing configuration, for receiving the blank between the outer mould and the inner mould in the open configuration, for subsequently pressing the blank between the outer mould and the inner mould in the pressing configuration to form the box, and for discharging the blank from in between the outer mould and the inner mould in the open configuration after pressing and forming the box, wherein the outer mould and the inner mould comprise mould element sets of an outer mould element of the outer mould and an associated inner mould element of the inner mould, the outer mould elements of the mould element sets define the outer mould and the inner mould elements of the mould element sets define the inner mould, and the outer mould element and the inner mould element of a mould element set are movable relative to one another along the pressing direction between positions associated with the open configuration and the pressing configuration, wherein the mould element sets are movable relative to another along a plane transverse to the pressing direction to allow adjusting to dimensions of the box, and wherein the machine frame comprises a forming frame having forming frame holding parts that are movable relative to another along the plane transverse to the pressing direction, and each mould element set is attached to a respective forming frame holding part, and wherein the forming frame holding parts are drivingly coupled for relative movement with respect to one another along the plane transverse to the pressing direction at two coupling locations on each forming frame holding part, which coupling locations are separated by a distance along the pressing direction.

In an embodiment, the forming frame comprises two pairs of two adjacent forming frame holding parts, and the two forming frame holding parts of a pair of two adjacent forming frame holding parts are drivingly coupled to one another by a forming frame driving part at each of the two coupling locations of the two adjacent forming frame holding parts for driving movement of the two forming frame holding parts of the pair of two adjacent forming frame holding parts relative to one another along the plane transverse to the pressing direction.

In an embodiment, one of the forming frame holding parts of each pair of two adjacent forming frame holding parts is fixed with respect to the respective forming frame driving parts, while the other one of the forming frame holding parts of each pair of two adjacent forming frame holding parts is drivingly coupled to the respective forming frame driving parts.

In an embodiment, respective forming frame driving parts coupled to each pair of two adjacent forming frame holding parts are drivingly coupled to one another for driving movement of the pairs of two adjacent forming frame holding parts relative to another along the plane transverse to the pressing direction.

In an embodiment, the respective forming frame driving parts are drivingly coupled to one another by fixed frame driving parts of a fixed frame of the machine frame.

In an embodiment, two respective forming frame driving parts drivingly coupled to one another are drivingly coupled to one another by two fixed frame driving parts to form a rectangular configuration with the fixed frame driving parts.

In an embodiment, the forming frame driving parts are drivingly coupled to move the two pairs of two adjacent forming frame holding parts symmetrically with respect to a plane parallel to the pressing direction (P) and in between the two pairs of two adjacent forming frame holding parts.

In an embodiment, the box-forming apparatus comprises a blank conveyor extending along a blank conveying line parallel to or within the plane parallel to the pressing direction and between the two pairs of two adjacent forming frame holding parts.

In an aspect the invention provides a box-forming apparatus, optionally according to any one of the preceding embodiment, wherein the box-forming apparatus comprises a machine frame and an outer mould and an inner mould arranged on the machine frame for forming a blank into a box, wherein the outer mould is associated with an outside of the box and the inner mould is associated with an inside of the box, and wherein the outer mould and the inner mould are configured to be movable relative to one another along a pressing direction between an open configuration and a pressing configuration, for receiving the blank between the outer mould and the inner mould in the open configuration, for subsequently pressing the blank between the outer mould and the inner mould in the pressing configuration to form the box, and for discharging the box from in between the outer mould and the inner mould in the open configuration after pressing and forming the box, wherein the outer mould and the inner mould comprise mould element sets of an outer mould element of the outer mould and an associated inner mould element of the inner mould, the outer mould elements of the mould element sets define the outer mould and the inner mould elements of the mould element sets define the inner mould, and the outer mould element and the inner mould element of each mould element set are movable relative to one another along the pressing direction between positions associated with the open configuration and the pressing configuration, wherein the mould element sets are movable relative to another along a plane transverse to the pressing direction to allow adjusting to dimensions of the box to be formed, and wherein the box forming apparatus comprises a first blank storage unit configured and arranged for storing thereon a pile of blanks in a slanted position of the blanks and for allowing to pull a blank from the bottom of a pile of blanks provided on the first blank storage unit;

an arm configured and arranged to allow the arm to pull a blank from the bottom of a pile of blanks provided on the first blank storage unit and to position the blank pulled from the bottom of the pile of blanks provided on the first blank storage unit onto a blank conveyor for conveying the blank to in between the outer mould and the inner mould; and a second blank storage unit configured and arranged for storing thereon a pile of blanks in a slanted position of the blanks and for allowing to pull a blank from the bottom of a pile of blanks provided on the second blank storage unit, wherein the second blank storage unit and the arm are configured and arranged to allow the arm to pull a blank from the bottom of a pile of blanks provided on the second blank storage unit and to position the blank pulled from the bottom of the pile of blanks provided on the second blank storage unit onto the blank conveyor for conveying the blank to in between the outer mould and the inner mould.

In an embodiment, the first blank storage unit and the second blank storage unit are arranged to have sides of blanks provided on the first blank storage unit and the second blank storage unit directed towards each other, and wherein the arm is movable between positions to allow pulling a blank from the bottom of a pile provided on the first blank storage unit and a pile provided on the second blank storage unit.

In an embodiment, the arm is linearly movable in an arm translation direction between positions to allow pulling a blank from the bottom of a pile provided on the first blank storage unit and a pile provided on the second blank storage unit, and pivotable about an axis directed in the arm translation direction. A translation is understood to be a linear movement.

In an embodiment, the arm is configured to make a joint linear movement in the arm translation direction and a pivot movement about the axis directed in the arm translation direction when pulling a blank from the bottom of a pile of blanks provided on the first blank storage unit or the second blank storage unit and positioning the blank on the blank conveyor.

In an embodiment, the blank conveyor extends along a blank conveying line extending in between the first blank storage unit and the second blank storage unit.

In an embodiment, the arm translation direction is transverse to the blank conveying line.

BRIEF DESCRIPTION OF THE DRAWINGS

Further features and advantages of the invention will become apparent from the description of the invention by way of non-limiting and non-exclusive embodiments. These embodiments are not to be construed as limiting the scope of protection. The person skilled in the art will realize that other alternatives and equivalent embodiments of the invention can be conceived and reduced to practice without departing from the scope of the present invention. Embodiments of the invention will be described with reference to the accompanying drawings, in which like or same reference symbols denote like, same or corresponding parts, and in which.

DETAILED DESCRIPTION OF EMBODIMENTS

Figure 1:
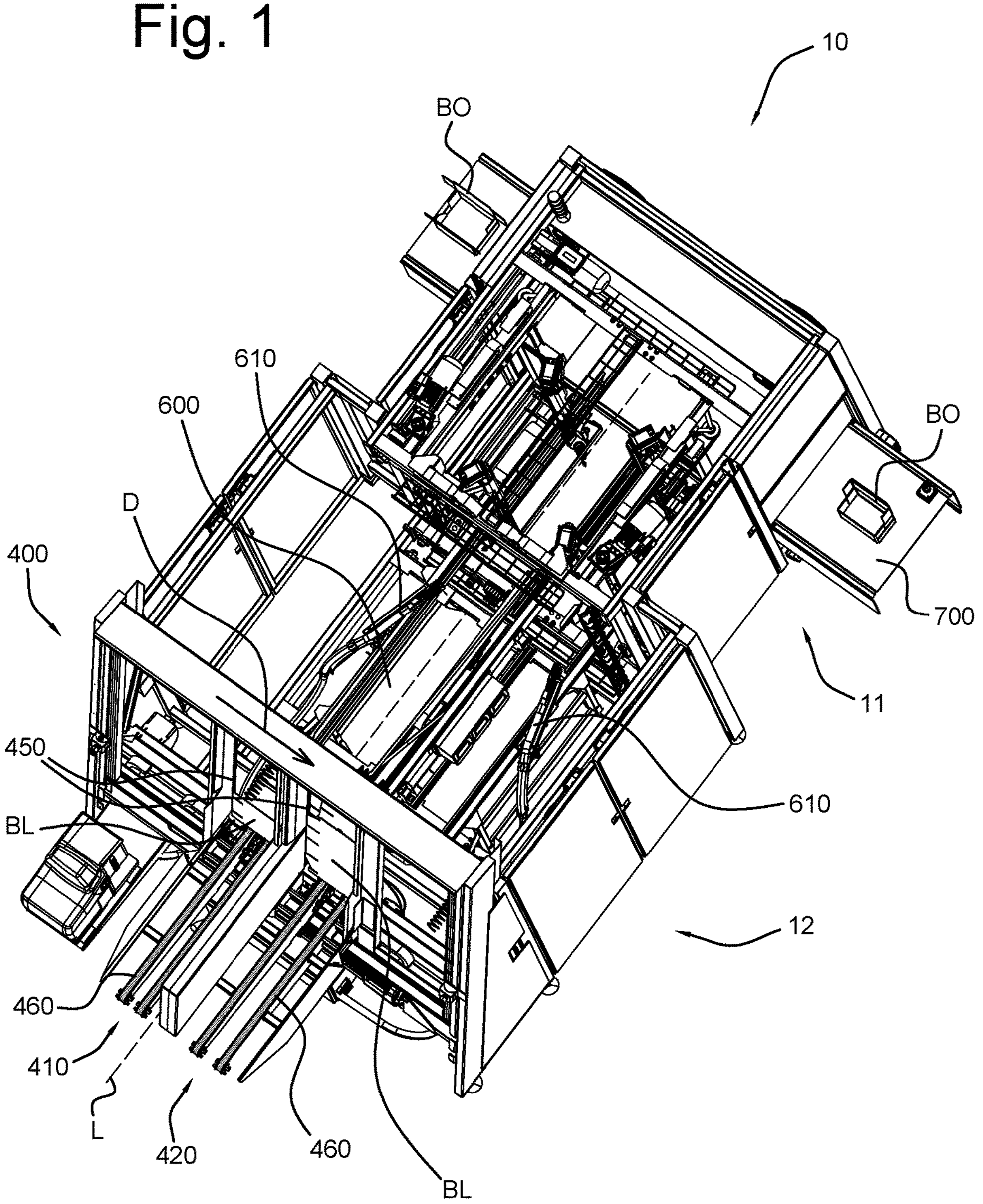
FIG. 1 shows a perspective view from above on an embodiment of a box-forming apparatus according to the invention.

FIG. 1 shows a box forming apparatus 10 having a box-forming section 11 for forming a box from a blank, and a blank storage and feed-in section 12 for storing blanks and supplying blanks one at a time to the box-forming section. The blank storage and feed-in section 12, also visible in FIG. 2, has a blank storage part 400 for storing blanks to be supplied to the box-forming section. The blank storage part 400 has a first blank storage unit 410 for storing a pile of first blanks to form a first type of packing box, and a second blank storage unit 420 to store a pile of second blanks for forming a second type of packing box. Both storage units 410, 420 are configured to carry the piles of blanks in a slanted position. The piles of blanks are supported against blank supports 450 that leave an open area, which allows to pull a blank from a back side of the piles facing the box-forming section, and are supported on advance mechanisms 460 for advancing blanks in the piles once a blank has been taken from the back side of a pile to keep the piles against the blank supports 450. The storage units are arranged with respect to one another such that sides of blanks provided on the first blank storage unit 410 and the second blank storage unit 420 are directed towards each other. Only a single blank BL is shown on either blank storage unit in FIGS. 1 and 2. Blank storage unit 410 is shown to carry a relatively small blank, while blank storage unit 420 is shown to carry a relatively large blank.

Figure 2:
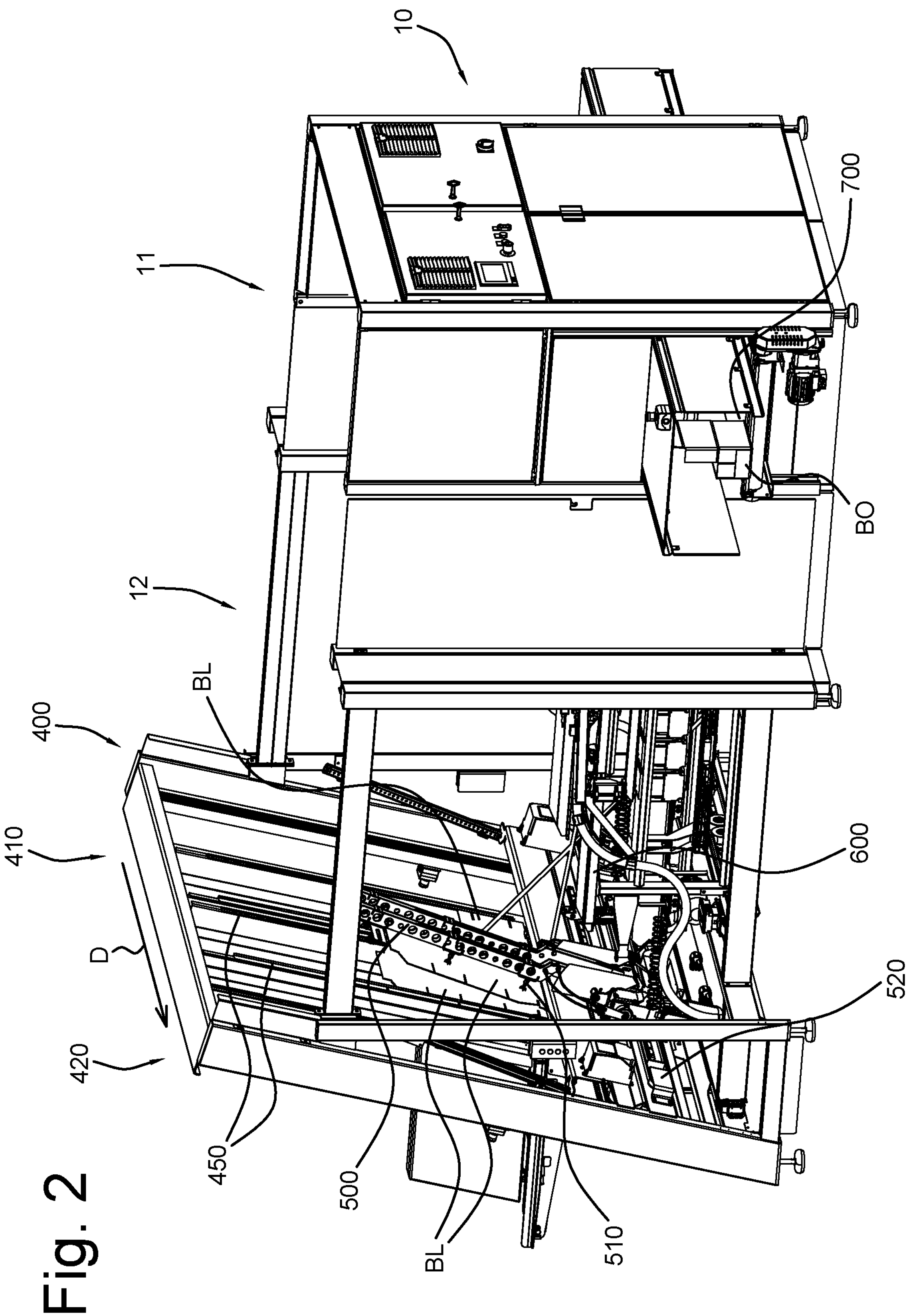
FIG. 2 shows a perspective side view on the box-forming apparatus of FIG. 1, with sides partly take away.

Arm 500 allows pulling a blank BL from the back side of the pile of blanks provided on both blank storage units and has a suction arrangement 510 for gripping and holding a blank. The arm 500 can be linearly moved (translated) along an arm translation direction D by the linear drive 520 between a position in front of the first blank storage unit 410 or a position in front of the second blank storage unit 420, where it is shown in FIG. 2, to allow pulling a blank from the back side of the pile on the respective blank storage unit. When pulling a blank from the back side of the pile, the arm 500 is pivoted about an axis corresponding with the arm translation direction D and at the same time translated along the arm translation direction D by the linear drive 520 for making a joint translation and pivot movement to position the blank onto the blank conveyor 600 to further convey the blank to the box-forming section 11 for forming a box from the blank. A conveyor is here to be understood as any means for advancing the blank. The blank conveyor 600 comprises, in the embodiment shown, side guide rails and a pusher rail for pushing the blank in between, and extends along a blank conveying line L. The blank conveying line L is transverse to the arm translation direction D and extends in between the first blank storage unit 410 and the second blank storage unit 420.

During formation of the box from the blank, the arm 500 is linearly moved back to either one of the blank storage units 410, 420 to take a next blank by pulling it from the back side of the pile of blanks on the respective blank storage unit and positioning the blank onto the blank conveyor 600. As soon as the previous blank has been processed and formed into a box in the box-forming section 11, the blank on the blank conveyor 600 is conveyed to the box-forming section. Glue guns 610 are positioned to the side of the blank conveyor 600 for the application of a glue to applicable panels of the blank to allow attaching those panels to which glue has been applied to respective other panels of the blank in the box formation in the box-forming section.

Figure 3A:
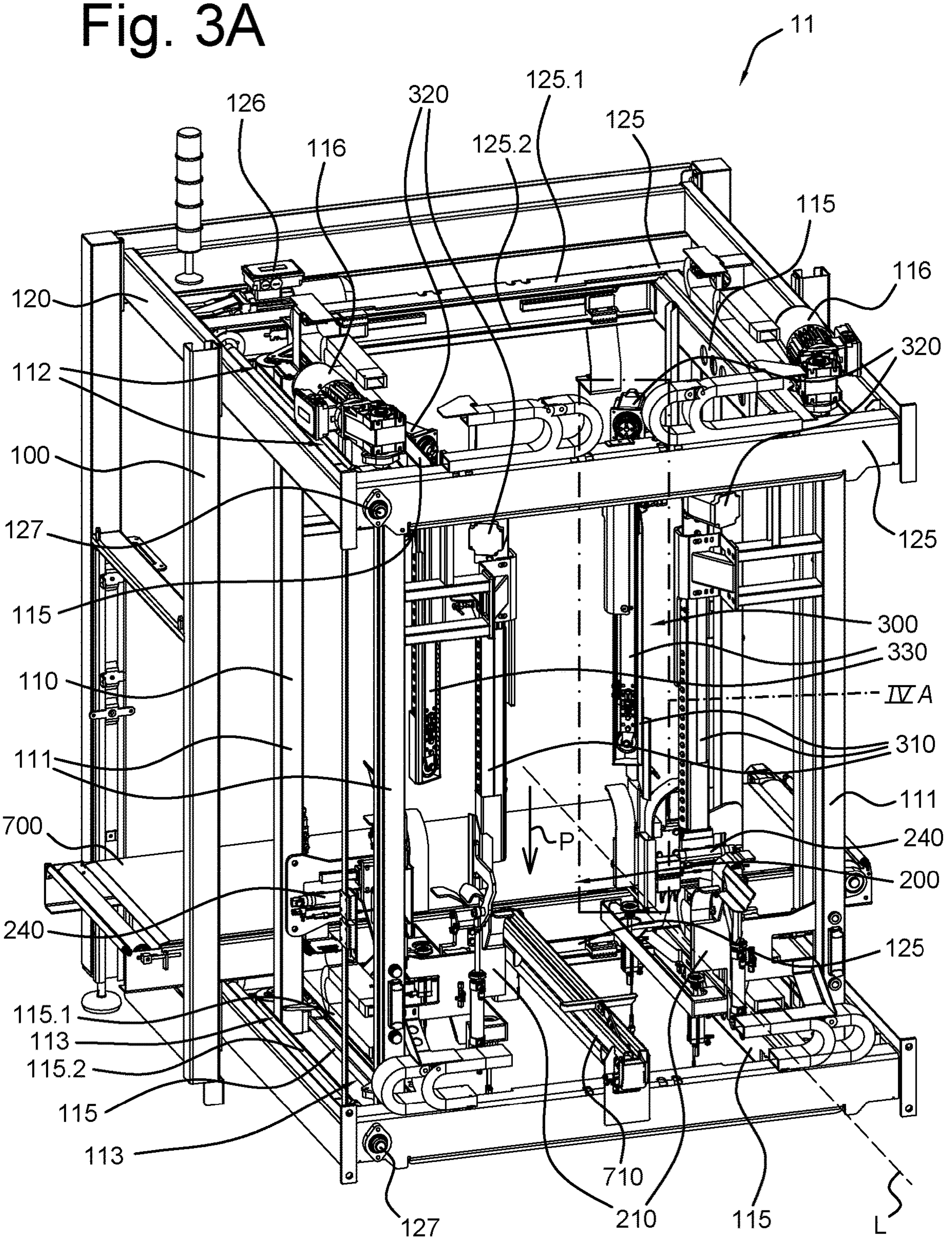
FIG. 3A shows a perspective view on a box-forming section of the box-forming apparatus of FIG. 1, with parts taken away, and with the outer and inner moulds in the open configuration.
Figure 3B:
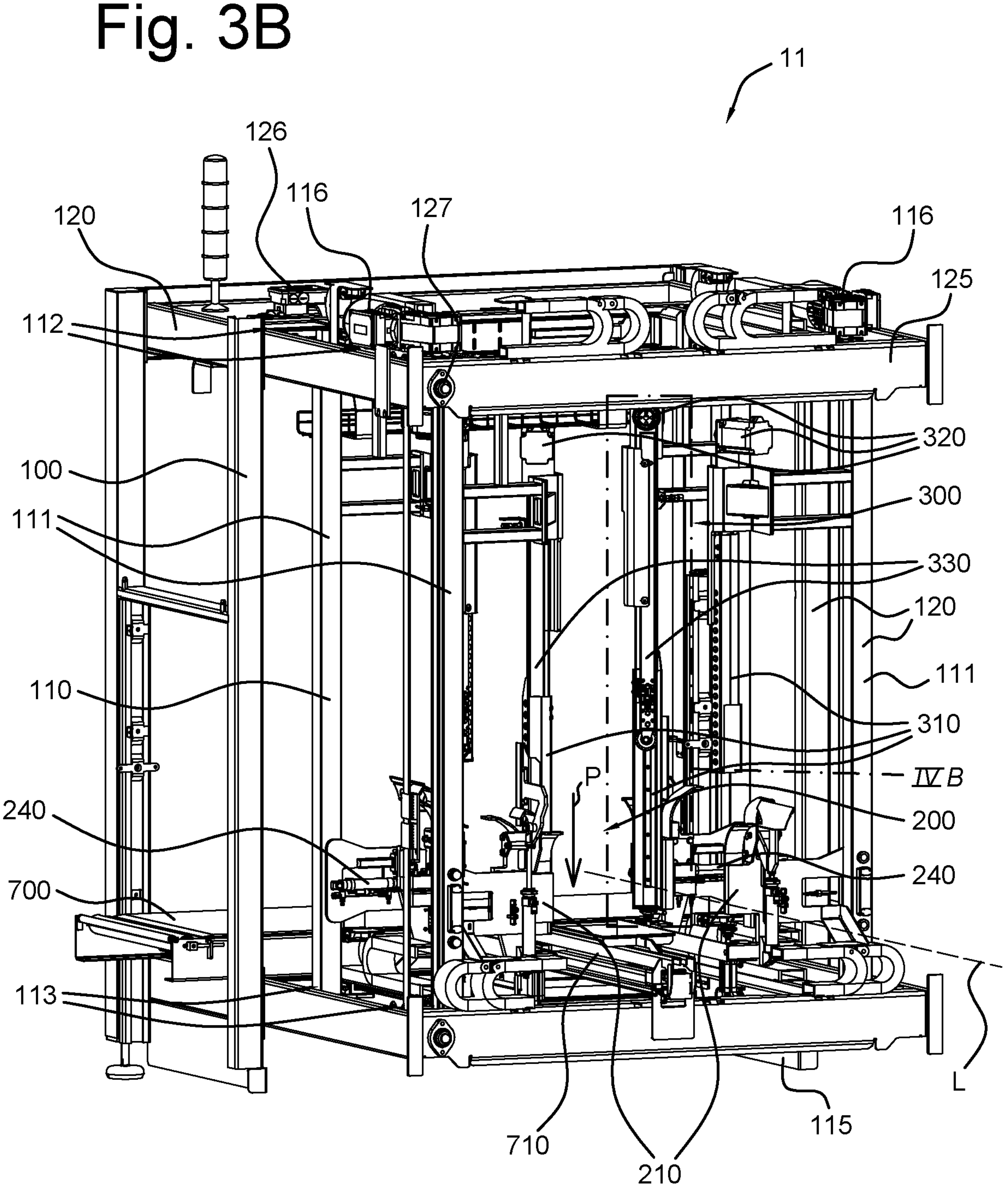
FIG. 3B shows a perspective view on the box-forming section of the box-forming apparatus of FIG. 1, with parts taken away, and with the inner and outer mould elements of two mould element sets in a configuration corresponding with the outer and inner moulds in the closed configuration and the other two mould element sets in a configuration corresponding with the open configuration.
Figure 4A:
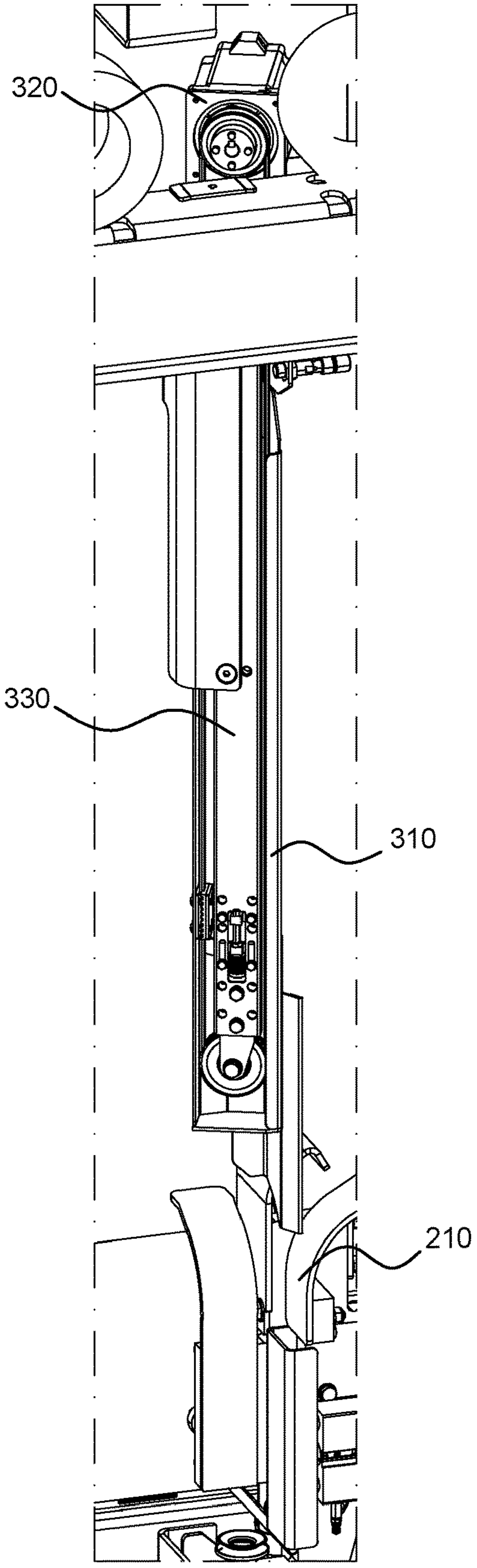
FIG. 4A shows a mould element set of the box-forming apparatus of FIG. 3A in detail, with the respective outer and inner mould elements in a position corresponding with the open configuration.
Figure 4B:
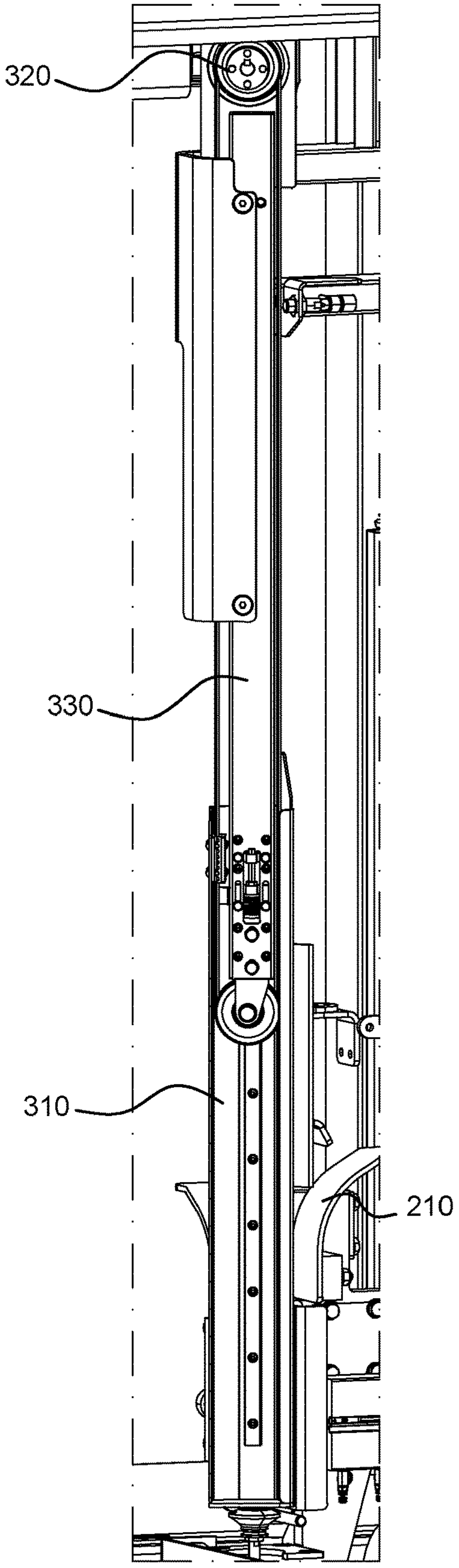
FIG. 4B shows a mould element set of the box-forming apparatus of FIG. 3B in detail, corresponding with the one of FIG. 4A, with the respective outer and inner mould elements in a position corresponding with the closed configuration.

FIGS. 3A and 3B show the box-forming section 11 from its side to which blanks are supplied from the blank storage and feed-in section 12 in slightly different perspective views. The blank conveying line L is shown in FIGS. 3A and 3B The figures show a machine frame 100 of the box-forming apparatus 10 and box-forming section 11, and an outer mould 200 and an inner mould 300 that are arranged on the machine frame.

In the process of forming a box from a blank BL, the blank is provided between the inner and outer moulds and on the outer mould 200. Subsequently, the inner mould 300 is moved downward to press the blank into the outer mould 200 to shape the blank into a box shape. In this process, the panels to which a glue has been applied are provided against adjacent panels of the box to attach these panels to one another. The outer mould 200 is associated with an outside of the box and the inner mould 300 is associated with an inside of the box. The outer mould and the inner mould are movable relative to one another along a pressing direction P between an open configuration and a pressing configuration. FIG. 3A show the open configuration, and FIG. 3B shows part of the inner and outer moulds in the open configuration and part in the pressing configuration (and not showing a blank being pressed into a box shape). The pressing direction P is perpendicular to a blank conveying plane of the blank along which the blank is provided and supported in between the inner and outer moulds on the outer mould 200.

In the embodiment shown, the outer mould 200 is configured to be fixedly attached to the machine frame 100 in the pressing direction P, while the inner mould 300 is configured to be movable with respect to the machine frame in the pressing direction and thus with respect to the outer mould. In the open configuration, a blank can be provided in between the outer and inner moulds. Subsequently, the inner mould is moved downward to the pressing configuration of the inner and outer moulds to shape the blank into the box form. After forming the box, the inner mould is moved upward again to the open configuration to allow discharging the box from in between the inner and outer moulds. The inner and outer moulds are adjustable along a plane perpendicular to the pressing direction to the size of the box to be formed from a blank as will be further described below.

The outer mould 200 comprises four outer mould elements 210 associated with the corners of a box to be formed. Each outer mould element 210 comprises, in the embodiment shown, a curvature to guide the blank when pressed into the outer mould. Each outer mould element comprises two curved parts that each guide a panel of the box to be formed, which panels will be adjacent to one another in the finally formed box. Both curved parts transition into respective vertical parts that enclose an angle of 90 degrees with respect to each other as seen in a plane transverse to the pressing direction P. The outer mould and the inner mould are positioned and configured such that the outer mould elements 210 contact that side of the blank that corresponds to the outside of the box to be formed. The vertical parts of an outer mould element 210 provide adjacent panels at a corner of the box into a 90 degree configuration.

The inner mould 300 comprises four inner mould elements 310 associated with the corners of a box to be formed. Each inner mould element 310 comprises, in the embodiment shown, two vertical parts that encloses an angle of 90 degrees with respect to each other as seen in a plane transverse to the pressing direction P. The outer mould and the inner mould are positioned and configured such that the inner mould elements 310 contact that side of the blank that corresponds to the inside of the box to be formed. The vertical parts of an inner mould element 310 provide adjacent panels at a corner of the box into a 90 degree configuration in conjunction with an associated outer mould element 210.

Each inner mould element 310 comes in a mould element set with an associated outer mould element 210. The box-forming machine 10 has four mould element sets of associated outer and inner mould elements 210, 310 at corner positions of the box (to be) formed. The outer mould elements 210 of the mould element sets define the outer mould 200, and the inner mould elements 310 of the mould element sets define the inner mould 300. The outer mould element and the inner mould element of each mould element set are movable relative to one another along the pressing direction P between positions associated with the open configuration and the pressing configuration.

In the embodiment shown, the outer mould elements 210 are fixedly attached to the machine frame 100 in the pressing direction P, while the inner mould elements 310 are mounted on the machine frame to be movable with respect to the machine frame 100 along the pressing direction P. Each inner mould element is mounted on and guided by a mounting rail 330 that allows a linear movement of the respective inner mould element along the pressing direction P. Each inner mould element 310 is driven by its own associated actuator 320 for movement along its associated mounting rail 330. Each mounting rail 330 is fixedly attached to the machine frame 100 to allow movement of each inner mould element 310 with respect to the machine frame in the pressing direction P. FIG. 3A shows the inner mould elements 310 of all mould element sets in a position corresponding to the open configuration. FIG. 3B shows the inner mould elements 310 in the back on the right-hand side and in the front on the left-hand side of the figure in a position corresponding with the closed configuration, while the inner mould elements 310 in the back on the left-hand side and in the front on the right-hand side of the figure are in a position corresponding with the open configuration.

The actuators 320 of the respective inner mould elements 310 are, in the embodiment shown, embodied as electric motors, for instance, stepper motors, that each have their own driving electronics for driving the motors. Relative movement with respect to one another of the outer mould element and the inner mould element of each mould element set is mechanically independent from relative movement with respect to one another of the outer mould element and the inner mould element of any one of the other mould element sets. The electric motors 320 are electronically coupled to allow for a joint movement of the inner mould elements 310 with respect to the outer mould elements 210 of the respective mould element sets, which means that the inner mould elements move as a single inner mould 300. Electric coupling is to be understood as any joint control of the electric motors, for instance, through coupling of their driving electronics, including coupling through appropriate programming of the controllers of the driving electronics. The actuators 320 may be coupled such that the lower ends of the inner mould elements 310 are moved downward to a same vertical end position for forming the box. However, the configuration allows as well for setting a different vertical downward end position for each inner mould element 310, which can be advantageous in forming some types of boxes from a blank. For instance, this may be advantageous to correct for a possibly incorrect box shape due to friction between parts of the blank coming into mutual contact or in contact with the box-forming apparatus during box formation. The actuators 320 may be coupled to arrive at a same end position, or to make a coupled movement to end at different end positions in the pressing direction.

The machine frame 100 comprises a forming frame 110 and a fixed frame 120. The forming frame 110 has four forming frame holding parts 111. The forming frame holding parts are shown to extend along the pressing direction P in FIGS. 3A and 3B, and are movable relative to another along the plane transverse to the pressing direction P. Each mould element set is attached to and held by a respective forming frame holding part 111 so that the mould element sets are movable relative to another along the plane transverse to the pressing direction P. This allows adjusting to the dimensions of the box to be formed from a blank. Each mould element set can be positioned to correspond to a corner of a box to be formed from a respective blank.

The forming frame holding parts 111 are drivingly coupled for relative movement with respect to one another along the plane transverse to the pressing direction P at two coupling locations 112, 113 on each forming frame holding part. One coupling location 112 is shown at the top sides of the respective forming frame holding parts 111, and the other coupling location 113 is shown bottom sides of the respective forming frame holding parts, which are separated by a distance along the pressing direction.

The four forming frame holding parts 111 are grouped into two pairs of two adjacent forming frame holding parts. The two forming frame holding parts 111 of a pair of two adjacent forming frame holding parts are drivingly coupled to one another by a forming frame driving part 115 at each of the two coupling locations 112, 113 of the two adjacent forming frame holding parts. One pair of two adjacent forming frame holding parts 111 is shown on the left-hand side of FIGS. 3A and 3B, while the other pair is shown on the right-hand side of the figure. The forming frame driving parts 115 are configured for driving movement of the two forming frame holding parts 111 of each pair relative to one another along the plane transverse to the pressing direction P and parallel to the blank conveying line L. Respective forming frame driving parts 115 coupled to each pair of two adjacent forming frame holding parts 111 are drivingly coupled to one another for driving movement of the pairs of two adjacent forming frame holding parts 111 relative to another along the plane transverse to the pressing direction P and transverse to the blank conveying line L.

Respective forming frame driving parts 115 are drivingly coupled to one another by fixed frame driving parts 125 of the fixed frame 120 of the machine frame 100. At the top side of the machine frame, the two forming frame driving parts 115 drivingly coupled to the coupling locations 112 at the top sides of the forming frame holding parts 111 are drivingly coupled to one another by two fixed frame driving parts 125 to form a rectangular configuration with the fixed frame driving parts. In the same manner, at the bottom side of the machine frame, the two forming frame driving parts 115 drivingly coupled to the coupling locations 113 at the bottom sides of the forming frame holding parts 111 are drivingly coupled to one another by two fixed frame driving parts 125 to form a rectangular configuration with the fixed frame driving parts.

A forming frame driving part 115 has a horizontal bar 115.1 and an infinite belt 115.2 guided along the bar 115.1. The belts 115.2 of the top and bottom side forming frame driving parts 115 for a pair of two adjacent forming frame holding parts 111 are driven together by a single motor 116. FIGS. 3A and 3B show a motor 116 associated with the pair of two adjacent forming frame holding parts 111 on the left-hand side of these figures, and another motor 116 associated with the pair of two adjacent forming frame holding parts 111 on the right-hand side of these figures. In both pairs the forming frame holding parts 111 in the front of these figures, on the side directed to the blank storage and feed-in unit 12, are fixed with respect to the associated forming frame driving parts 115, while the forming frame holding parts 111 in the back of these figures are movable along the associated forming frame driving parts 115. The forming frame holding parts 111 in the back of these figure are coupled to the respective belts 115.2 for driving movement of these forming frame holding parts 111 along the respective horizontal bars 115.1, which is a movement parallel to the blank conveying line L. The forming frame holding parts 111 in the back of these figure are movingly coupled to the horizontal bars 115.1 of the respective forming frame driving parts 115 to allow movement of these forming frame holding parts with respect to their respective forming frame driving parts. The forming frame holding parts 111 on the side of the blank storage and feed-in unit 12 nog being movable along the blank conveying line L provides for less complicated mechanics as opposed to both the forming frame holding parts of a pair being movable along the blank conveying line L. Additionally, it provides for a minimum conveying stroke for a blank from the blank conveyor onto the outer mould 300, which is advantageous for throughput numbers of the machine, especially with respect to smaller sized boxes.

A fixed frame driving part 125 has a horizontal bar 125.1 and an infinite belt 125.2 guided along the bar 125.1. The belts 125.2 of the fixed frame driving parts 125 in the front and the back and in the top and the bottom of FIGS. 3A and 3B are driven together by a single motor 126. The axes 127 drivingly couple the infinite belts 125.2 of the fixed frame driving parts 125 in the front and the back of the figure, while another coupling axis that does not show in the figure couples the fixed frame driving parts in the top of the figure with the ones in the bottom of the figure. The forming frame driving parts 115 on the left-hand side of FIGS. 3A and 3B and the forming frame driving parts 115 on the right-hand side of the figure are all movable along the associated fixed frame driving parts 125. The forming frame driving parts 115 are coupled to the respective belts 125.2 for driving movement of the forming frame driving parts 115 along the respective horizontal bars 125.1. The forming frame driving parts 115 are movingly coupled to the horizontal bars 125.1 of the respective fixed frame driving parts 125 to allow movement of these forming frame driving parts with respect to the respective fixed frame driving parts. The forming frame driving parts 115 are drivingly coupled to the respective fixed frame driving part 125 to move the two pairs of two adjacent forming frame holding parts 111 on the left-hand side and on the right-hand of FIGS. 3A and 3B symmetrically with respect to a plane parallel to the pressing direction P and in between the two pairs of two adjacent forming frame holding parts 111. The blank conveying line L passes in between these two pairs, and is parallel to this plane and especially lying within this plane. The symmetric adjustment allows for a quick adjustment of the outer and inner moulds in the direction transverse to the blank conveying direction and for a straightforward layout of the machine.

A blank is conveyed along the blank conveying line L such that its panel corresponding to the bottom panel of the box to be formed is symmetrical with respect to this plane and the blank conveying line L. Both pairs of two adjacent forming frame holding parts 111 have been adjusted symmetrically with respect to the bottom panel and the blank conveying line L in opposite directions with respect to one another. The forming frame holding parts 111 in the back of FIGS. 3A and 3B have been adjusted as well along the blank conveying line L and the bottom panel with respect to the forming frame holding parts in the front of FIGS. 3A and 3B.

The dimensions of the box to be formed are set by moving the mould element sets relative to one another along the plane transverse to the pressing direction P. The movement of inner mould element 310 and outer mould element 210 with respect to one another is done by each mould element set of inner and outer mould element having its own respective actuator 320. Movement of the inner and out mould elements of a mould element set with respect to one another along the pressing direction P is therefore mechanically independent from movement of the mould element sets along the plane transverse to the pressing direction. This allows for having less play in movement of the inner and outer mould elements with respect to one another along the pressing direction P, and for less play in the movement of the mould element sets with respect to one another along the plane transverse to the pressing direction as compared to having a construction in which both movements along and transverse to the pressing direction are mechanically coupled. Having less play provides a more accurate and stable box-forming process and apparatus. The mechanically independent construction with an actuator coupled to each mould element set allows further for having a construction of reduced mass and friction as compared to known box-forming apparatus in which both movements along and transverse to the pressing direction are mechanically coupled. This allows for a higher throughput of boxes and for a faster setting of mutual positions of mould element sets for another dimension of a next type of box to be formed.

When the box just has been formed, the inner mould 300 is in a downward position to provide the pressing configuration of the outer and inner moulds as partly shown in FIG. 3B. Subsequently, the inner mould is moved upwards again to the open configuration of the outer and inner moulds as shown in FIG. 3A. The outer mould elements 210 aside the box conveyor 700 are moved away from one another to allow passing a formed box from the outer mould 200 onto the box conveyor 700. The box formed is then pushed by pushing arrangement 710 and discharged onto the box conveyor 700 passing in between the opened up outer mould elements 210 aside the box conveyor 700. Since the forming frame holding parts 111 are not adjusted along the blank conveying line L, the pusher of the pushing arrangement 710 can have a fixed stroke to push the ox onto the box conveyor.

The outer mould elements 210 aside the box conveyor 700 are movable, in the horizontal direction parallel to the box conveyor 700, mounted on their respective forming frame holding parts 111 with a linear movement mechanism 240 to allow moving those outer mould elements away from one another to allow passing a formed box from the outer mould 200 onto the box conveyor 700, after which those outer mould elements are moved back again to form the outer mould. The linear movement mechanisms 240 have an actuation cylinder to drive the respective outer mould elements in the horizontal direction in between the open position to allow passing a box and the position as part of the outer mould.

The box conveyor 700 in the embodiment shown in the figures is arranged in a transverse layout, having the conveying direction of the boxes transverse to the blank conveying line L. The box conveyor can be operated in either direction in the embodiment shown for conveying the box away from the box-forming apparatus towards a filling station for filling the box with articles. In an alternative embodiment, the box conveyor can be arranged in an in-line layout having the conveying direction of the boxes along the blank conveying line L. FIGS. 1 and 2 show boxes BO on the box conveyor 700, which have been formed from blanks BL supplied from the blank storage units 410, 420.

The blank provided on the blank conveyor 600 from a blank storage unit is now advanced onto the outer mould 200. When that blank has been taken from a different blank storage unit as compared to the previous blank for forming a different type of box, the forming frame holding parts 111 will be repositioned accordingly with respect to one another as described to reposition the mould element sets of outer and inner mould elements with respect to one another. The process as described is now repeated, and a next blank is taken from the first blank storage unit 410 or the second blank storage unit 420 by the arm 500 and placed onto the blank conveyor 600.

The invention claimed is:

1. A box forming apparatus comprising a machine frame and an outer mould and an inner mould arranged on the machine frame for forming a blank into a box, wherein the outer mould is associated with an outside of the box and the inner mould is associated with an inside of the box, and wherein the outer mould and the inner mould are configured to be movable relative to one another along a pressing direction between an open configuration and a pressing configuration, for receiving the blank between the outer mould and the inner mould in the open configuration, for subsequently pressing the blank between the outer mould and the inner mould in the pressing configuration to form the box, and for discharging the box from in between the outer mould and the inner mould in the open configuration after pressing and forming the box, wherein the outer mould and the inner mould comprise mould element sets of an outer mould element of the outer mould and an associated inner mould element of the inner mould, the outer mould elements of the mould element sets define the outer mould and the inner mould elements of the mould element sets define the inner mould, and the outer mould element and the inner mould element of each mould element set are movable relative to one another along the pressing direction between positions associated with the open configuration and the pressing configuration, wherein the mould element sets are movable relative to one another along a plane transverse to the pressing direction to allow adjusting to dimensions of the box to be formed, and wherein each mould element set comprises an actuator for actuating relative movement with respect to one another of the outer mould element and the inner mould element of the respective mould element set along the pressing direction for relative movement with respect to one another of the outer mould element and the inner mould element of each mould element set along the pressing direction to be mechanically independent from relative movement with respect to one another of the outer mould element and the inner mould element of each other mould element set along the pressing direction, and to be mechanically independent from movement of the mould element sets relative to one another along a plane transverse to the pressing direction.

2. The box forming apparatus according to claim 1, wherein the actuator of each mould element set actuates movement of one of the outer mould element and the inner mould element of the respective mould element set with respect to the machine frame along the pressing direction, while the other one of the outer mould element and the inner mould element of the respective mould element set is fixedly mounted on the machine frame with respect to the pressing direction.

3. The box forming apparatus according to claim 1, wherein the actuator of each mould element set comprises an electric motor.

4. The box forming apparatus according to claim 1, wherein the actuators of the mould element sets are electronically coupled for a joint relative movement of the outer mould element and the inner mould element of the respective mould element sets along the pressing direction.

5. The box forming apparatus according claim 1, wherein the machine frame comprises a forming frame having forming frame holding parts that are movable relative to one another along the plane transverse to the pressing direction, and each mould element set is attached to a respective forming frame holding part, and wherein the forming frame holding parts are drivingly coupled for relative movement with respect to one another along the plane transverse to the pressing direction at two coupling locations on each forming frame holding part, which coupling locations are separated by a distance along the pressing direction.

6. The box forming apparatus according claim 5, wherein the forming frame comprises two pairs of two adjacent forming frame holding parts, and the two forming frame holding parts of a pair of two adjacent forming frame holding parts are drivingly coupled to one another by a forming frame driving part at each of the two coupling locations of the two adjacent forming frame holding parts for driving movement of the two forming frame holding parts of the pair of two adjacent forming frame holding parts relative to one another along the plane transverse to the pressing direction.

7. The box forming apparatus according to claim 6, wherein one of the forming frame holding parts of each pair of two adjacent forming frame holding parts is fixed with respect to the respective forming frame driving parts, while the other one of the forming frame holding parts of each pair of two adjacent forming frame holding parts is drivingly coupled to the respective forming frame driving parts.

8. The box forming apparatus according to claim 6, wherein respective forming frame driving parts coupled to each pair of two adjacent forming frame holding parts are drivingly coupled to one another for driving movement of the pairs of two adjacent forming frame holding parts relative to one another along the plane transverse to the pressing direction.

9. The box forming apparatus according to claim 8, wherein the respective forming frame driving parts are drivingly coupled to one another by fixed frame driving parts of a fixed frame of the machine frame.

10. The box forming apparatus according to claim 9, wherein two respective forming frame driving parts drivingly coupled to one another are drivingly coupled to one another by two fixed frame driving parts to form a rectangular configuration with the fixed frame driving parts.

11. The box forming apparatus according to claim 8, wherein the forming frame driving parts are drivingly coupled to move the two pairs of two adjacent forming frame holding parts symmetrically with respect to a plane parallel to the pressing direction and in between the two pairs of two adjacent forming frame holding parts.

12. The box forming apparatus according to claim 11, wherein the box forming apparatus comprises a blank conveyor extending along a blank conveying line parallel to or within the plane parallel to the pressing direction and between the two pairs of two adjacent forming frame holding parts.

* * * * *